United States Patent
Wang et al.

(10) Patent No.: US 12,206,213 B2
(45) Date of Patent: Jan. 21, 2025

(54) ELASTIC PLUG-IN JAW STRUCTURE FOR TAP-OFF UNIT AND PLUG-IN STRUCTURE FOR BUSBAR TRUNKING SYSTEM

(71) Applicant: WETOWN ELECTRIC GROUP CO., LTD, Zhenjiang (CN)

(72) Inventors: Shubin Wang, Zhenjiang (CN); Wengong Jiang, Zhenjiang (CN); Kefeng Huang, Zhenjiang (CN); Cong Wang, Zhenjiang (CN); Yuxiang Zhu, Zhenjiang (CN)

(73) Assignee: WETOWN ELECTRIC GROUP CO., LTD, Zhenjiang (CN)

( * ) Notice: Subject to any disclaimer, the term of this patent is extended or adjusted under 35 U.S.C. 154(b) by 413 days.

(21) Appl. No.: 17/544,335

(22) Filed: Dec. 7, 2021

(65) Prior Publication Data

US 2022/0094123 A1 Mar. 24, 2022

Related U.S. Application Data

(63) Continuation of application No. PCT/CN2020/095020, filed on Jun. 9, 2020.

(30) Foreign Application Priority Data

Jun. 10, 2019 (CN) .......................... 201910496954.9
Jun. 10, 2019 (CN) .......................... 201910497562.4

(51) Int. Cl.
*H01R 25/16* (2006.01)
*H01R 4/48* (2006.01)
(Continued)

(52) U.S. Cl.
CPC ............. *H01R 25/162* (2013.01); *H01R 4/48* (2013.01); *H01R 13/502* (2013.01); *H01R 13/629* (2013.01); *H01R 13/639* (2013.01)

(58) Field of Classification Search
None
See application file for complete search history.

(56) References Cited

U.S. PATENT DOCUMENTS

| 10,622,768 B1 * | 4/2020 | Cowham ................ H01R 24/28 |
| 2019/0181584 A1 * | 6/2019 | Yamashita ............. H02G 3/083 |

(Continued)

FOREIGN PATENT DOCUMENTS

| CN | 202050081 U | 11/2011 |
| CN | 106300181 A | 1/2017 |

(Continued)

OTHER PUBLICATIONS

The World Intellectual Property Organization (WIPO) International Search Report for PCT /CN2020/095020 dated Sep. 15, 2020 6 Pages.

(Continued)

*Primary Examiner* — James Harvey
(74) *Attorney, Agent, or Firm* — ANOVA LAW GROUP, PLLC

(57) ABSTRACT

Disclosed is an elastic plug-in jaw structure for a tap-off unit. The elastic plug-in jaw structure for the tap-off unit includes a plug-in jaw and a flexible connector connected to the plug-in jaw. The plug-in jaw can be connected to a lead-out conductor in the tap-off unit through the flexible connector. An elastic member is arranged at a rear side end of the plug-in jaw. A pressing member abuts against a rear side of the elastic member. The pressing member is configured to elastically press against the plug-in jaw through the elastic member, to facilitate a direct electrical connection between the plug-in jaw and a busbar conductor.

9 Claims, 3 Drawing Sheets

(51) Int. Cl.
*H01R 13/502* (2006.01)
*H01R 13/629* (2006.01)
*H01R 13/639* (2006.01)

(56) References Cited

U.S. PATENT DOCUMENTS

2022/0094123 A1* 3/2022 Wang .................. H01R 13/639
2023/0115788 A1* 4/2023 Kanematsu .......... H01R 4/4863
439/485

FOREIGN PATENT DOCUMENTS

| CN | 106374256 A | 2/2017 |
|---|---|---|
| CN | 208508073 U | 2/2019 |
| CN | 110323609 A | 10/2019 |
| CN | 110323705 A | 10/2019 |
| CN | 210201002 U | 3/2020 |
| DE | 2912944 A1 | 10/1980 |
| DE | 202017104106 U1 | 8/2017 |

OTHER PUBLICATIONS

The Indonesia Intellectual Proprty Office Examination Report for Application No. P00202110871 Jan. 18, 2024 4 Pages (including translation).

* cited by examiner

ELASTIC PLUG-IN JAW STRUCTURE FOR TAP-OFF UNIT AND PLUG-IN STRUCTURE FOR BUSBAR TRUNKING SYSTEM

CROSS-REFERENCES TO RELATED APPLICATIONS

This application is a continuation application of PCT Application No. PCT/CN2020/095020, filed on Jun. 9, 2020, which claims priorities to Chinese Patent Application No. 201910496954.9 and Chinese Patent Application No. CN 201910497562.4, both filed with the Chinese Patent Office on Jun. 10, 2019, the entire contents of all of which are incorporated herein by reference.

TECHNICAL FIELD

The present invention relates to an accessory for power transmission and distribution, and in particular, to an elastic plug-in jaw structure for a tap-off unit and a plug-in structure for busway.

BACKGROUND

For compact busways, conductors are closely arranged in a busbar trunking system (also referred as a busway). However, there is usually a need to draw power from the conductors in the busway. A conventional method of power drawing generally includes providing plug-in openings at one side of the busway, respectively welding plug-in connectors on the phase conductors, and arranging a tap-off unit at the plug-in openings. According to the existing method, the phase conductors are respectively welded with parallelly arranged plug-in connectors, and each plug-in connector is electrically connected to a corresponding plug-in jaw in the tap-off unit. In order to solve the creepage distance problem, due to compact arrangement of the phase conductors, the plug-in connectors of multiple phases can only be lined up transversely in one column, resulting in greater spacings among the plug-in jaws in the tap-off unit. Thus, the tap-off unit has a very large size, causing complicate process of manufacturing the whole structure, poor appearance, and high manufacturing cost. Besides, the design of the plug-in structure is unreasonable, plug-in frictional resistance is high, the plug-in action is laborious and time-consuming, and use effect is poor.

SUMMARY OF INVENTION

An objective of the present invention is to provide an elastic plug-in jaw structure for a tap-off unit which makes the tap-off unit small in overall size, low in manufacturing cost and high in plug-in reliability.

Another objective of the present invention is to provide a plug-in structure for a plug-in type busway which is compact in structure, small in overall size, simple in manufacturing process, low in cost and high in plug-in reliability, and saves both time and labor.

In order to solve the foregoing technical problem, one aspect of the present invention provides an elastic plug-in jaw structure for a tap-off unit, including a plug-in jaw and a flexible connector connected to the plug-in jaw. The plug-in jaw is connected to a lead-out conductor in the tap-off unit through the flexible connector. An elastic member is arranged at a rear end of the plug-in jaw. A pressing member abuts against a rear side of the elastic member. The pressing member is configured to elastically press against the plug-in jaw through the elastic member, to facilitate a direct electrical connection between the plug-in jaw and a busbar conductor.

As a preferred technical solution of the elastic plug-in jaw structure for the tap-off unit, a surface of the busbar conductor is fixedly covered by an insulation material.

As a preferred technical solution of the elastic plug-in jaw structure for the tap-off unit, the plug-in jaw is installed to a plug-in jaw base. The plug-in jaw is configured to cooperate with a plug-in opening base on a busway. The plug-in opening base is configured to act as a guide track to the plug-in jaw during a plugging operation.

As a preferred technical solution of the elastic plug-in jaw structure for the tap-off unit, the pressing member includes a hinge with a fixed shaft at one end of the hinge and a pressing mechanism at the other end of the hinge. The pressing mechanism is configured to swing the hinge along the fixed shaft, to drive the plug-in jaw to be electronically connected to the busbar conductor.

As a preferred technical solution of the elastic plug-in jaw structure for the tap-off unit, the pressing mechanism is a cam mechanism.

As a preferred technical solution of the elastic plug-in jaw structure for the tap-off unit, an end face of the hinge is fixedly provided with a guide sleeve. The elastic member is a spring, and the spring is sleeved at the rear end of the plug-in jaw and contained within the guide sleeve.

As a preferred technical solution of the elastic plug-in jaw structure for the tap-off unit, the plug-in jaw and the flexible connector are connected by welding.

As a preferred technical solution of the elastic plug-in jaw structure for the tap-off unit, a front end of the plug-in jaw is provided with a U-shaped groove.

As a preferred technical solution of the elastic plug-in jaw structure for the tap-off unit, the pressing mechanism includes a screw structure.

Another aspect of the present invention provides a plug-in structure for a busway, including busbar conductors of multiple phases arranged side by side in the busway, and a tap-off unit having plug-in jaws of a plurality of phases. The busway is provided with plug-in openings, and the busbar conductor of each of the multiple phases has a corresponding plug-in opening. The plug-in jaw of each phase is directly plugged into the busway via one of the plug-in openings and is electrically connected to a side surface of the busbar conductor of the corresponding phase. The plug-in jaw of each phase is connected to a flexible connector. The plug-in jaw of each phase is connected to a lead-out conductor of the corresponding phase in the tap-off unit via the corresponding flexible connector. A rear end of the plug-in jaw of each phase is provided with an elastic member. A rear side of each elastic member abuts against a pressing member. The pressing member is configured to press against the corresponding plug-in jaw through the elastic member, to enable direct electrical connection between the plug-in jaw of each phase and the busbar conductor of the corresponding phase.

As a preferred technical solution of the plug-in structure for the busway, the plug-in openings are arranged in a pattern of two ports and three ports in alternative columns, and the flexible connectors corresponding to the plug-in jaws arranged on the same column have a staggered layout.

As a preferred technical solution of the plug-in structure for the busway, surfaces of the busbar conductors are fixedly covered by an insulation material.

As a preferred technical solution of the plug-in structure for the busway, the plug-in jaw of each phase is installed through a plug-in jaw base. The plug-in openings are disposed on a plug-in opening base. The plug-in jaws are electrically connected to the corresponding busbar conductors after passing through the plug-in opening base.

As a preferred technical solution of the plug-in structure for the busway, the pressing member includes a hinge with a fixed shaft at one end of the hinge and a pressing mechanism at the other end of the hinge. The pressing mechanism is configured to swing the hinge along the fixed shaft, to drive the corresponding plug-in jaw to be electronically connected to the corresponding busbar conductor.

As a preferred technical solution of the plug-in structure for the busway, the pressing mechanism is a cam mechanism.

As a preferred technical solution of the plug-in structure for the busway, an end face of the hinge is fixedly provided with a guide sleeve. The elastic member is a spring, and the spring is sleeved at the rear end of the corresponding plug-in jaw and is contained within the guide sleeve.

The present invention has the following beneficial effects: after the foregoing structure is applied, based on the configuration of the plug-in jaw being pressed by the pressing member and the elastic member, and based on the configuration of the plug-in jaw being connected to the flexible connector, the plug-in jaw can be electrically connected to the busbar conductor directly through an elastic pressing by the elastic member on the plug-in jaw. The plug-in jaw is simple in design, small in thickness, compact in overall structure. Plug-in cooperation is achieved without additional welding process on the plug-in opening corresponding to the busbar conductor, thus greatly reducing the overall size and lowering the processing and manufacturing cost. The plug-in cooperation can be realized by just using the surface of the busbar conductor, plug-in is very convenient, and plug-in/plug-out actions are also time-saving and effort-saving. Pressing driving force provided by the elastic member also effectively ensures sufficient contact pressure and provides high contact reliability.

After the foregoing structure is applied, based on the plug-in openings being disposed on the busway at locations corresponding to the busbar conductors of multiple phases, and based on configurations of the plug-in jaws of multiple phases having the same spacings as the busbar conductors of the multiple phases, the plug-in jaws of multiple phases are densely arranged, and can be directly plugged into the busway via different plug-in openings and electrically connected to side surfaces of the busbar conductors of corresponding phases. Hence, conductors of each phase are closely arranged, heat dissipation of the busway is maintained and improved, and meanwhile a space occupied by the plug-in jaws of multiple phases is reduced, the whole scale of the tap-off unit is decreased and processing and manufacturing cost is lowered. Besides, the structure of the plug-in jaws being elastically pressed by the elastic members is skillfully arranged, which makes the plug-in action time-saving and labor-saving, makes the plug-in action occurs prior to the pressing action, and greatly improves the connection convenience and conductive reliability.

BRIEF DESCRIPTION OF THE DRAWINGS

The present invention will be further described in detail with reference to the drawings and embodiments.

REFERENCE NUMERALS

1. Busway; 2. Busbar conductor; 3. Plug-in jaw; 4. Tap-off unit; 5. Plug-in opening; 6. Flexible connector; 7. Elastic member; 8. Pressing member; 9. Insulation material; 10. Plug-in jaw base; 11. Plug-in opening base; 12. Fixed shaft; 13. Hinge; 14. Pressing mechanism; 15. Lead-out conductor; 16. Guide sleeve.

DESCRIPTION OF THE PREFERRED EMBODIMENTS

The technical solutions of the embodiments of the present invention will be further described in detail to make the solved technical problems, applied technical solutions and reached technical effects of the present invention clearer. Obviously, the described embodiments are only a portion of the embodiments, not all embodiments of the present invention. Based on the embodiments of the present invention, all other embodiments obtained by those skilled in the art without inventive activity belong to the scope of protection of the present invention.

In the description of the present invention, the terms "connected to", "connection" and "fixed to" shall be understood in a broad sense unless otherwise specified and defined clearly. For example, the terms may be understood as fixed connection, removable connection or integral connection; mechanical connection or electrical connection; or direct connection or indirect connection through an intermediate medium, or internal connection of two elements or interaction between two elements. Those of ordinary skill in the art can understand the specific meanings of these terms in the present invention according to actual application scenarios.

In the present invention, unless otherwise specified and defined, a first feature being "above" or "below" a second feature may indicate a direct contact between the first feature and the second feature, or may indicate a contact between the first feature and the second feature through an additional feature between them, instead of the direct contact. Moreover, the first feature being "over", "above" and "on" the second feature may indicate that the first feature is directly above or diagonally above the second feature, or indicate that the first feature is higher in a horizontal level than the second feature. The first feature being "under", "below" and "beneath" the second feature may indicate that the first feature is directly below or diagonally below the second feature, or merely indicates that the first feature is lower in a horizontal level than the second feature.

Embodiment 1

Figure 1:
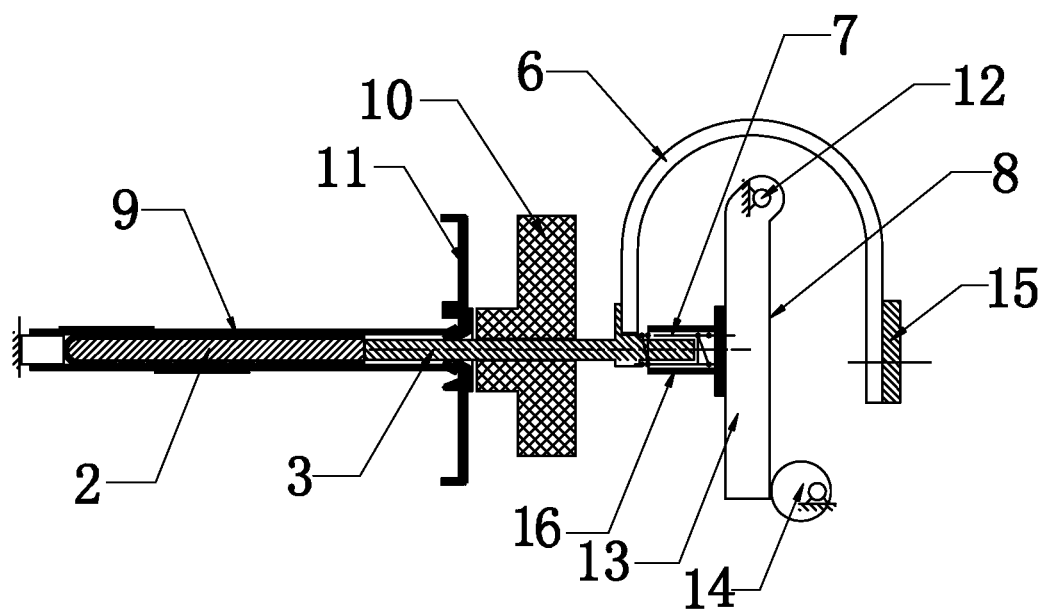
FIG. 1 is a structure diagram of an elastic plug-in jaw for a tap-off unit according to an embodiment of the present invention.
Figure 2:
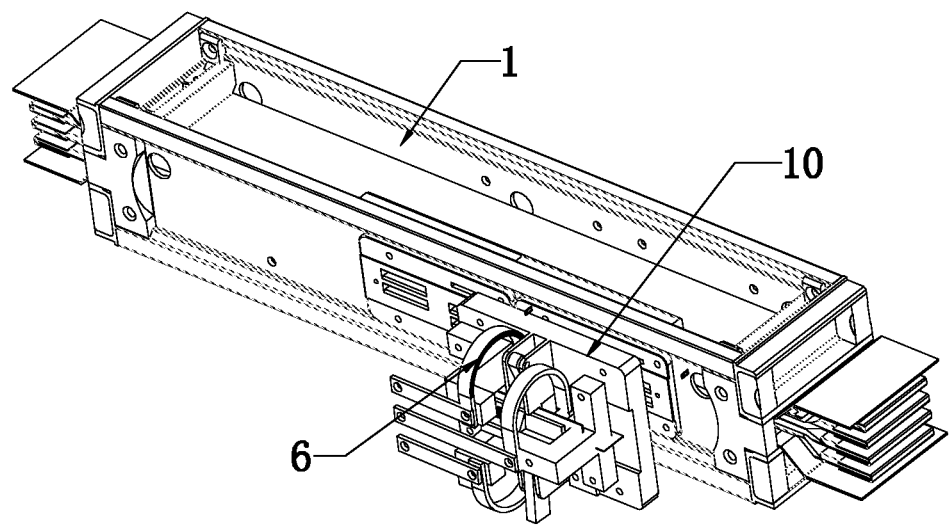
FIG. 2 is a three-dimensional structure diagram of elastic plug-in jaws for a tap-off unit being plugged into a busway according to an embodiment of the present invention.
Figure 3:
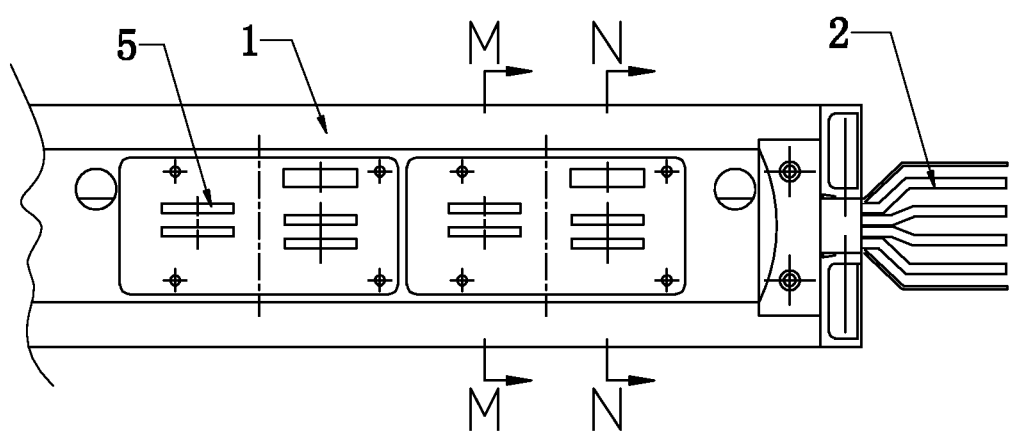
FIG. 3 is a three-dimensional structure diagram of a busway according to an embodiment of the present invention.
Figure 4:
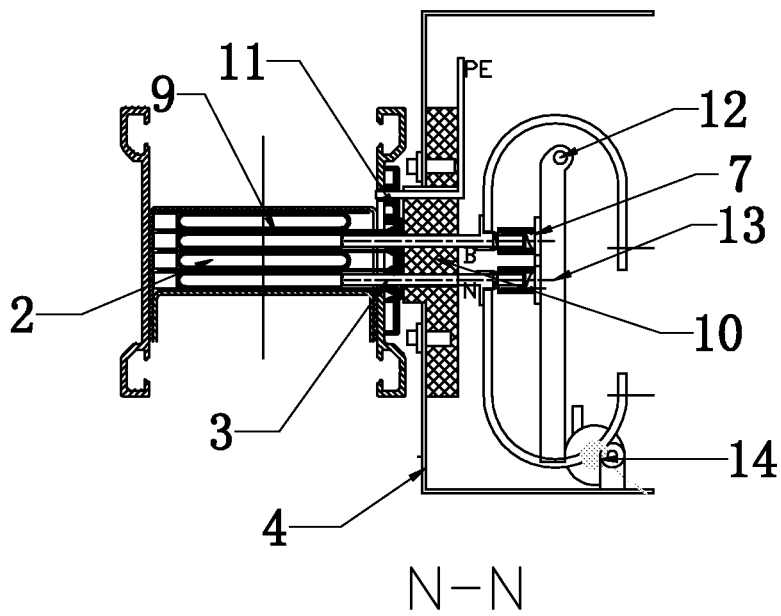
FIG. 4 is a sectional view in an N-N direction in FIG. 3.
Figure 5:
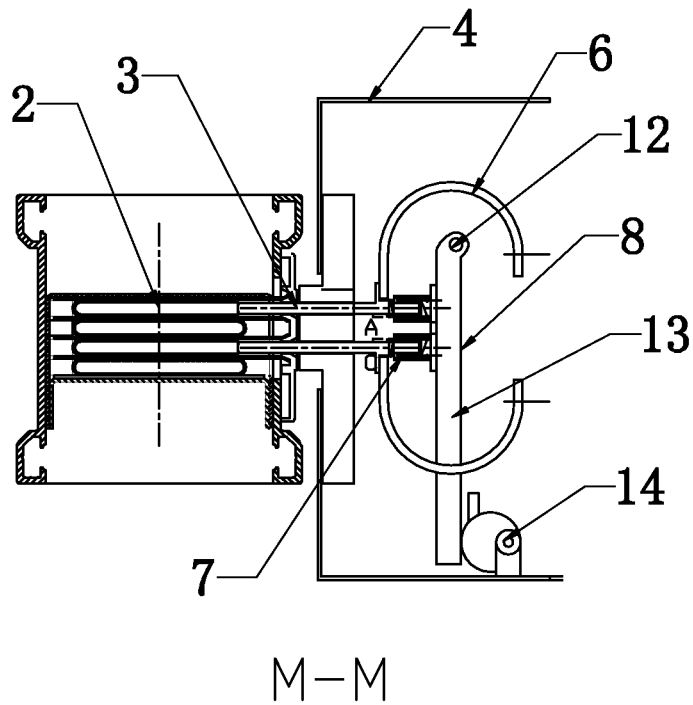
FIG. 5 is a sectional view in an M-M direction in FIG. 3.

As shown in FIG. 1, an elastic plug-in jaw structure for a tap-off unit 4 according to the present invention, includes a plug-in jaw 3 (e.g., made of copper) and a flexible connector 6 welded and connected to the plug-in jaw 3. The plug-in jaw 3 may also be understood as a plug-in conductor. The plug-in jaw 3 can be connected to a lead-out conductor 15 in the tap-off unit 4 via the flexible connector 6. The plug-in jaw 3 is provided with a plug-in jaw base 10; a busway 1 is provided with a plug-in opening base 11. The plug-in jaw 3 is configured to cooperate with the plug-in opening base 11 on the busway 1, and is guided by the plug-in opening base 11. Specifically, the plug-in jaw base 10 is configured to position the plug-in jaw 3, and the plug base 11 is configured to act as a guide track for the plug-in jaw 3 during a plugging in action (e.g., when the tap-off unit is plugging in the busway). An elastic member 7 (e.g., a spring) is provided at a rear end of the plug-in jaw 3. A pressing member 8 abuts against a rear side of the elastic member 7. As can be seen from the figures, a step is disposed at a rear section of the plug-in jaw 3, the elastic member 7 is sleeved on the rear section of the plug-in jaw 3 and is position-limited by the step. The pressing member 8 is configured to press against the plug-in jaw 3 through the elastic member 7 so that the plug-in jaw 3 is electrically connected to a busbar conductor 2 directly. The busbar conductor 2 has a rectangular or elliptic structure The structure arrangement allows direct conductive contact between the plug-in jaw 3 and the busbar conductor 2 without additionally welding multiple plug-in connectors on the busbar conductor 2, thus decreasing an overall thickness and making spacing between plug-in phase conductors more compact, greatly decreasing the overall size, which achieves small space occupation and good appearance. Moreover, the busbar conductor 2 is not separately manufactured so that the manufacturing process is simple, and the contact pressure is maintained by the spring so that reliability of the conductor is high.

Further, a front end of the plug-in jaw 3 is provided with a U-shaped groove. A surface of the U-shaped groove is a conductive contact surface. A side surface of the busbar conductor 2 is a conductive contact surface corresponding to the plug-in jaw 3. When the conductive contact surface of the plug-in jaw 3 is in contact with the side surface of the busbar conductor 2, a conductive connection is achieved. Other surfaces of the busbar conductor 2 is fixedly covered by an insulation material 9. The pressing member 8 comprises a hinge 13 with a fixed shaft 12 at one end and a pressing mechanism 14 arranged at the other end of the hinge 13. The pressing mechanism 14 is preferably a cam mechanism. The cam mechanism is configured to swing the hinge 13 along the fixed shaft 12 to drive the plug-in jaw 3 to be electrically connected to the busbar conductor 2.

The pressing mechanism 14 may adopt other pressing methods, such as a fastener or a locking element, etc. A guide sleeve 16 is fixedly installed onto the plug-in jaw 3 at a location corresponding to an end face of the hinge 13. The guide sleeve 16 is made from the insulation material 9. The spring is sleeved at the rear end of the plug-in jaw 3 and contained in the guide sleeve 16 through the step.

When the elastic plug-in jaw structure is in use, after the plug-in jaw 3 passes through a plug-in opening 5 of the plug-in opening base 11 and contacts the busbar conductor 2, the cam mechanism is rotated to drive the hinge 13 to compress the spring, and then the cam mechanism is fixed to maintain a contact pressure at the contact part between the plug-in jaw 3 and the busbar conductor 2. Therefore, a connection between an end of the plug-in jaw 3 and the busbar conductor 2 is achieved, one section of the flexible connector 6 may be adjusted up and down elastically, and another section of the flexible connector 6 that is in contact with the lead-out conductor 15 may remain rigid and stationary, to maintain contact pressure from the spring.

Embodiment 2

As shown in FIGS. 1-5, a plug-in structure for a busway 1 according to the present invention includes busbar conductors 2 of multiple phases which are closely arranged side by side in the busway 1, and a tap-off unit 4 having plug-in jaws 3 of a plurality of phases. The busbar conductor 2 of each phase has a corresponding plug-in opening 5 disposed in the busway 1. As can be seen from the figures, the plug-in openings 5 are disposed on a plug-in opening base 11. A spacing between the plug-in jaws 3 of two phases is equal to a spacing between the busbar conductors 2 of two phases. That is, the plug-in jaw 3 of each phase have a one-to-one correspondence with the busbar conductor 2 of the same phase. The plug-in jaw 3 of each phase is directly plugged into the busway 1 via a different plug-in opening 5 and is electrically connected to a side surface of the corresponding busbar conductor 2. Such structure arrangement achieves a reliable conductive connection by skillfully using the cooperation between a specific structure of the side surface of the busbar conductor 2 and the corresponding plug-in jaw 3 without increasing an overall structure size.

Further, the plug-in jaw 3 of each phase is connected to a flexible connector 6. The plug-in jaw 3 of each phase is connected to a lead-out conductor 15 of the corresponding phase in a tap-off unit 4 via the corresponding flexible connector 6. A rear end of the plug-in jaw 3 of each phase is provided with an elastic member 7. The elastic member 7 is preferably a spring. A rear side of each elastic member 7 abuts against a pressing member 8. The pressing member 8 includes a hinge 13 hinged by a fixed shaft 12 at one end of the hinge 13 and a pressing mechanism 14 disposed at the other end of the hinge 13. The pressing mechanism 14 is preferably a cam mechanism, or may adopt other locking mechanisms, for example, a fixed connection method using a fastener such as a locking member or a bolt. An end face of the hinge 13 is fixedly provided with one or more guide sleeves 16. Each guide sleeve 16 is located at one side of the corresponding plug-in jaw 3. Each spring is sleeved at a rear end of the corresponding plug-in jaw 3 and the corresponding guide sleeve 16. The pressing mechanism 14 is configured to swing the corresponding hinge 13 along the fixed shaft 12 to drive the plug-in jaws 3 to be electrically connected to the busbar conductors 2. The pressing member 8 is configured to elastically press a corresponding plug-in jaw 3 by using the corresponding elastic member 7, to facilitate a direct electrical connection between the plug-in jaw 3 and the busbar conductor 2 of the corresponding phase.

The plug-in openings 5 are arranged in a pattern of two ports and three ports in alternative columns. That is, two columns may be arranged, two plug-in openings 5 are arranged side by side in one column, and three plug-in openings 5 are arranged side by side in the other column. In one embodiment, L1 and L3 ports are in one column located in front of another column containing ports PE, L2, and N. The arrangement of the pattern of the two and three ports in alternative columns, when compared with existing side by side arrangement in a same line and with same size requirements of the plug-in openings 5, can allow two sets of plug-in openings 5 placed side by side. The capacity of the tap-off unit 4 can be expanded by connecting the two plug-in openings 5 in parallel. Further, the flexible connectors 6 corresponding to the plug-in jaws 3 arranged on the same column have a staggered layout, so that the different flexible connectors 6 are not interfered with each other, saving the overall space. In addition, a surface of each of the busbar conductors 2 is fixedly covered by an insulation material 9.

Further, the plug-in jaws 3 of a plurality of phases are installed through the plug-in jaw base 10. The plug-in jaws 3 of the plurality of phases are pre-assembled to the plug-in jaw base 10 during manufacture and then fixed on a body of the tap-off unit 4. The plug-in jaws 3 are electrically connected to the busbar conductors 2 after passing through the plug-in opening base 11. A front end of each of the plug-in jaws 3 is provided with a U-shaped groove. A surface of the U-shaped groove is a conductive contact plane. The side surfaces of the busbar conductors 2 serve as conductive contact planes corresponding to the plug-in jaws 3. All conductive part of the surfaces of the busbar conductors 2 are plated with silver. The conductive contact planes of the plug-in jaws 3 are in conductive contact with the side surfaces of the busbar conductors 2, thereby achieving connections between the conductors.

Further, in one embodiment, two plug-in openings 5 are placed in parallel, and just one of the plug-in openings 5 is used when a rated current is small. When the rated current of the tap-off unit 4 increases, a rated carrying capacity of the tap-off unit 4 can also be increased by connecting two plug-in jaws respectively corresponding to two plug-in openings 5 of the same phase in parallel through a connection bar inside the tap-off unit 4. In this way, the tap-off unit 4 can accommodate a full range of rated currents (40~1,000 A). In the present disclosure, it can be understood that the orientation or positional relationship of the terms such as "up", "down", "left" and "right" are merely for describing and simplifying the operation, instead of indicating or implying that the referred device or element must have specific orientation, or must be made and operated by the specific orientation, and thus cannot be understood as a limitation for the present invention. Besides, the terms "first" and "second" are merely for descriptive distinction, but do not have special meanings.

In the present disclosure, the description with reference to the terms "one embodiment" or "example" refers to that the specific features, structures, materials or characteristics in combination with the embodiment or example are included into at least one embodiment or example of the present invention. In the present disclosure, the illustrative expressions of the above terms do not necessarily refer to the same embodiment or example.

In addition, it should be appreciated that the present disclosure is described in accordance with the implementation, but not every implementation only includes one independent technical solution. The description herein is for clarity only. Those skilled in the art should treat the present disclosure as a whole, and the technical solutions in all embodiments may be properly combined to form other implementations that can be understood by those skilled in the art.

The technical principle of the present invention is described in combination with the specific embodiments. These descriptions are merely for explaining the principle of the present invention, but cannot be explained as the limit for the scope of protection of the present invention by any means. Based on the explanation here, those skilled in the art can think of other specific implementations of the present invention without the exercise of inventive faculty, and these implementations will fall into the scope of protection of the present invention.

What is claimed is:

1. An elastic plug-in jaw structure for a tap-off unit, comprising:
   a plug-in jaw provided with a plug-in jaw base; and
   a flexible connector connected to the plug-in jaw, wherein:
   the plug-in jaw is configured to be connected to a lead-out conductor in the tap-off unit through the flexible connector, and to cooperate with a plug-in opening base on a busway, wherein the plug-in base is configured to act as a guide track for the plug-in jaw;
   an elastic member is arranged at a rear end of the plug-in jaw;
   a pressing member abuts against a rear side of the elastic member;
   the pressing member is configured to elastically press against the plug-in jaw through the elastic member, to facilitate a direct electrical connection between the plug-in jaw and a busbar conductor,
   wherein the pressing member comprises a hinge with a fixed shaft at one end of the hinge and a pressing mechanism arranged at the other end of the hinge; and
   the pressing mechanism is configured to swing the hinge along the fixed shaft, to drive the corresponding plug-in jaw to be electronically connected to the corresponding busbar conductor.

2. The elastic plug-in jaw structure for the tap-off unit according to claim 1, wherein, the pressing mechanism is a cam mechanism.

3. The elastic plug-in jaw structure for the tap-off unit according to claim 1, wherein:
   a face of the hinge is fixedly provided with a guide sleeve; and
   the elastic member is a spring, and the spring is sleeved at the rear end of the plug-in jaw and contained within the guide sleeve.

4. The elastic plug-in jaw structure for the tap-off unit according to claim 3, wherein, the plug-in jaw and the flexible connector are connected by welding.

5. A plug-in structure for a busway, comprising:
   busbar conductors of multiple phases arranged side by side in the busway; and
   a tap-off unit having plug-in jaws of a plurality of phases, each of the plug-in jaws having a corresponding phase, wherein:
   the busway is provided with multiple plug-in openings respectively corresponding to the busbar conductors of the multiple phases;
   each of the plug-in jaws is directly plugged into the busway via one of the plug-in openings and is electrically connected to a side surface of one of the busbar conductor of the corresponding phase;
   each of the plug-in jaws is connected to a flexible connector;
   each of the plug-in jaws is connected to a lead-out conductor of the corresponding phase in the tap-off unit via the corresponding flexible connector;
   each of the plug-in jaws is installed through a plug-in jaw base, the plug-in openings are disposed on a plug-in opening base, and the plug-in jaws are electrically connected to the corresponding busbar conductors after passing through the plug-in opening base;
   a rear end of each of the plug-in jaws is provided with an elastic member;
   a rear side of each elastic member abuts against a pressing member; and
   each pressing member is configured to press against one of the corresponding plug-in jaws through the corresponding elastic member, to enable direct electrical connection between each of the plug-in jaws and the one of the busbar conductors of the corresponding phase,
   wherein each pressing member comprises a hinge with a fixed shaft at one end of the hinge and a pressing mechanism arranged at the other end of the hinge, and the pressing mechanism is configured to swing the hinge along the fixed shaft, to drive the one of the corresponding plug-in jaws to be electronically connected to the one of the corresponding busbar conductors.

6. The plug-in structure for the busway according to claim 5, wherein, the plug-in openings are arranged in a pattern of two ports and three ports in alternative columns, and the flexible connectors corresponding to the plug-in jaws arranged on the same column have a staggered layout.

7. The plug-in structure for the busway according to claim 6, wherein, surfaces of the busbar conductors are fixedly covered by an insulation material.

8. The plug-in structure for the busway according to claim 5, wherein, the pressing mechanism is a cam mechanism.

9. The plug-in structure for the busway according to claim 5, wherein:
- a face of the hinge is fixedly provided with a guide sleeve; and
- the elastic member is a spring, and the spring is sleeved at the rear end of the corresponding plug-in jaw and is contained within the guide sleeve.

* * * * *